(12) United States Patent
Ullein et al.

(10) Patent No.: US 6,599,209 B1
(45) Date of Patent: Jul. 29, 2003

(54) TENSIONING DEVICE FOR TENSIONING A TRACTION MEDIUM

(75) Inventors: Thomas Ullein, Stegaurach (DE); Rudolf Wimmer, Haidershofen (AT)

(73) Assignees: INA-Schaeffler KG, Herzogenaurach (DE); Bayerische Motoren Werke Aktiengesellschaft, München (DE)

( * ) Notice: Subject to any disclaimer, the term of this patent is extended or adjusted under 35 U.S.C. 154(b) by 0 days.

(21) Appl. No.: 09/583,607

(22) Filed: May 31, 2000

(51) Int. Cl.[7] ................................................. F16H 7/08
(52) U.S. Cl. .................................... 474/111; 474/140
(58) Field of Search .............................. 474/111, 140, 474/110, 135, 101, 136, 138, 109, 112

(56) References Cited

U.S. PATENT DOCUMENTS

| 2,261,316 A |   | 11/1941 | Weller |         |
|-------------|---|---------|--------|---------|
| 4,193,314 A |   | 3/1980  | Horner et al. |  |
| 4,832,664 A | * | 5/1989  | Groger et al. | 474/111 |
| 5,286,234 A | * | 2/1994  | Young | 474/111 |
| 5,425,680 A | * | 6/1995  | Young | 474/111 |
| 5,665,019 A | * | 9/1997  | Sheffer et al. | 474/111 |
| 5,782,625 A | * | 7/1998  | Young | 474/138 |
| 6,036,613 A | * | 3/2000  | Deihm | 474/140 X |
| 6,068,567 A | * | 5/2000  | Thompson | 474/111 |

FOREIGN PATENT DOCUMENTS

| DE | 952869       | * | 10/1956 |
| DE | 3744668      | * | 9/1988  |
| DE | 19821564 A1  |   | 11/1999 |
| DE | 19856705 A1  |   | 6/2000  |
| EP | 55166        | * | 1/1980  |
| EP | 0 055162 A1  | * | 12/1981 |
| GB | 989582       | * | 4/1965  |
| GB | 2217807 A    |   | 11/1989 |
| JP | 3-79842      | * | 4/1994  |
| JP | 06301120 A   |   | 10/1994 |
| SU | 1726872      | * | 4/1992  |

* cited by examiner

Primary Examiner—Marcus Charles
(74) Attorney, Agent, or Firm—Volpe and Koenig, P.C.

(57) ABSTRACT

A tensioning device for tensioning a traction medium, especially a chain, is provided. The tensioning device includes a supporting body element attachable to a third object and at least one tensioning track capable of being applied against the traction medium. The supporting body element and the tensioning track being joined together as one piece.

27 Claims, 4 Drawing Sheets

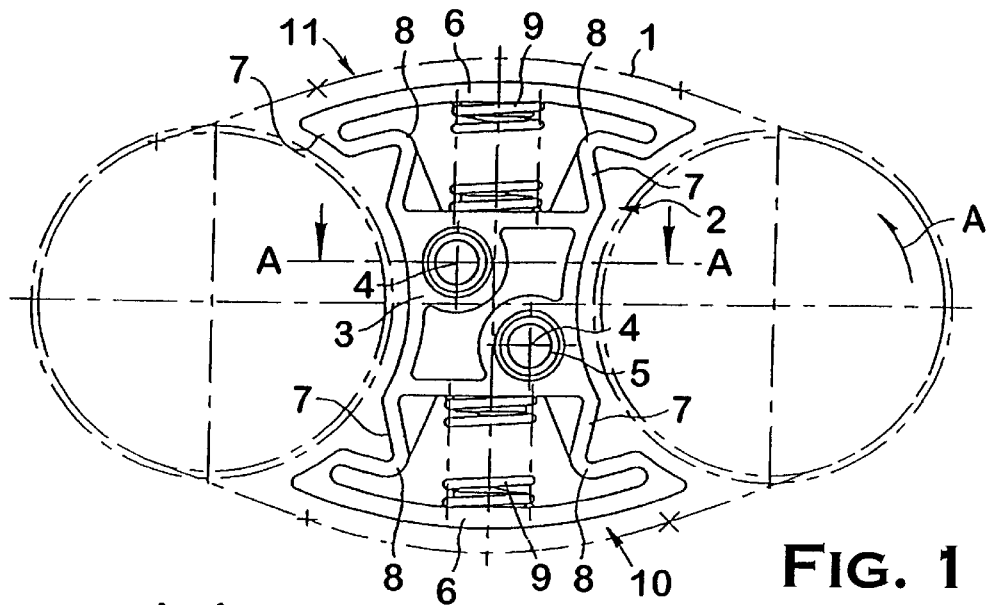
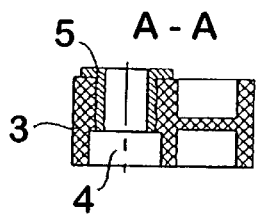
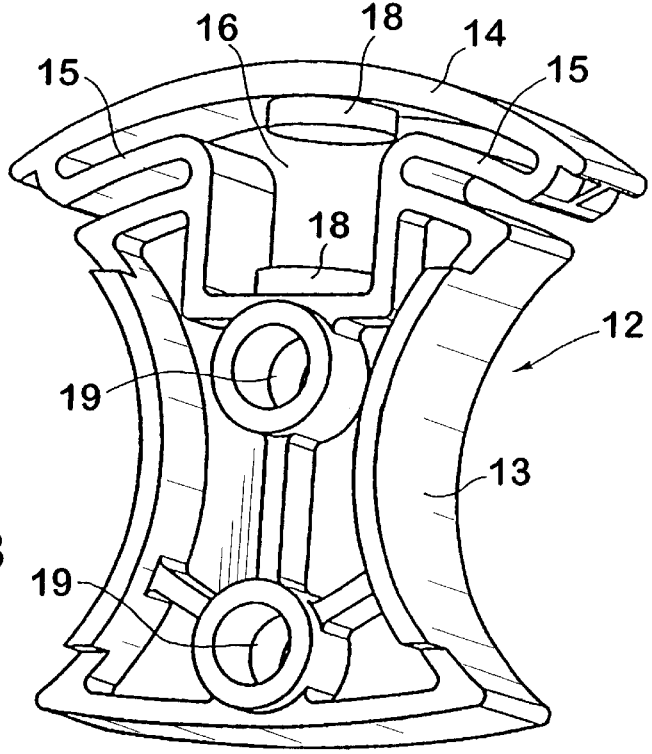
FIG. 1
FIG. 2
FIG. 3

TENSIONING DEVICE FOR TENSIONING A TRACTION MEDIUM

BACKGROUND

The present invention concerns a tensioning device for tensioning a traction medium, especially a chain. Such a tensioning device can be used, for example, in the timing drive of internal combustion engines. The tensioning device can be attached to a third object, for example, to the motor block or cylinder head.

In the timing drive of machines such as, for example, internal combustion engines, a traction medium, for example, in the form of a chain or a belt, is typically used to synchronize two driven machine parts, for example, two cam shafts. For this purpose, it is necessary that the traction medium be constantly under tension in order to ensure satisfactory coupling. This is realized via a tensioning device exhibiting a supporting body element which it is attached to a machine element, for example, to the motor block, the cylinder head, or the timing housing cover. A known tensioning device such as that described, for example, in U.S. Pat. No. 2,963,819, further includes one or two spring-loaded, chain-engaging, and consequently chain-tensioning tracks movably supported on the body element via a guide bolt. Depending on the arrangement of the tensioning device, the traction medium is pressed by such a system either toward or away from the connecting line between the axes of rotation of the machine parts coupled by the traction medium. Previously known tensioning devices consist, however, of a number of individual parts which need to be produced and machined in elaborate fashion as individual parts and then assembled in a further manufacturing step. The elaborate and complicated manufacture and assembly of previously known tensioning devices disadvantageously affect production costs.

The present invention is therefore concerned with the problem of providing a tensioning device which can be produced simply and economically.

SUMMARY

The problem with which the present invention is concerned is solved through the fact that in the case of a device for tensioning a traction medium, especially a chain or a belt, including a supporting body element attached to a third object and at least one tensioning track capable of being applied against the drawing means, the supporting body element and the tensioning track are joined together as one piece.

In the tensioning device according to the present invention, the essential elements of the apparatus, namely, the supporting body element and the one or (as can be further provided according to the invention) two tensioning tracks are thus arranged or joined together as one piece. The supporting body element and tensioning track(s) thus form a single one-piece part. As a result, the elaborate separate manufacture and assembly of individual parts such as occur in the state of the art are very advantageously eliminated. The tensioning device according to the present invention is therefore simply constructed and economically producible. Since the tensioning device according to the present invention can be made of plastic, it can be realized with special advantage in the form of a simple and convenient injection-molded part. The tensioning track can be provided, if necessary, with an additional antifriction coating.

According to a first embodiment of the present invention, the tensioning track and the supporting body element can be joined together via elastically deformable bar- or rib-like interconnecting sections. These elastically deformable interconnecting sections are designed to produce a high elastic force. This elastic property makes it possible to compensate for any tolerances in the timing drive or any changes in the drive resulting from heat expansion or wear. Similarly, operation-related positional changes in the tensioned chain, for example, chattering of the chain, can be absorbed or compensated in this way. The elastic property which makes it possible for the tensioning track to be movable with respect to the supporting body element can be realized through the fact that the interconnecting sections have an angled design. Alternatively, the interconnecting sections can be designed in the form of a honeycomb pattern.

In addition to the arrangement of elastically deformable interconnecting sections, one can, according to the present invention, position a spring element between the supporting body element and the tensioning track, through which the tensioning track is forced away from the supporting body element. The elastic force produced can be further increased and the tensioning properties further improved by this spring element. However, for the case in which the elastic interconnecting sections are designed to give sufficient elastic stiffness, the use of an additional spring element is not absolutely necessary.

If a plastic, preferably polyamide, is used as the material for the supporting body element and the tensioning track, further advantages result in connection with the described spring element: the temperature in the engine compartment of a motor vehicle can reach approximately 120° C. The modulus of elasticity of the plastic is significantly lower at this elevated temperature—in certain cases, down to a tenth—than at the lower temperature prevailing in the engine compartment with a cold motor. Under the tension load of the chain, the tensioning track (when no spring element is employed) could possibly be shifted in undesired fashion in the direction of the supporting body element, i.e., away from the chain. This could be disadvantageous especially when the motor is turned off and the tensioning track cools down and hardens in the shifted or lowered position since then the desired chain tension might possibly no longer be present. Under the elastic load of the spring element, this undesired shifting is checked or clearly reduced.

A further advantage the tensioning track formed entirely from plastic can be seen in the fact that the tensioning track is pressed against the chain by the elastic load over a large part of track's extension in the running direction of the chain. In the case of conventional tensioning tracks of rigid design, the track is convexly curved on its side facing the chain. In the case of a newly installed chain which has not yet been stretched under load, the chain is so tautly tensioned that it runs almost simply tangent to the convexly curved tensioning track. The stretched chain, in contrast, hugs the tensioning track over a long run. In the case of the chain tensioner according to the present invention, the tensioning track and the spring can be designed and shaped for interplay with each other such that the convex curvature of the tensioning track on its side facing the chain can be changed by the elastic load and the force exercised by the chain, specifically such that both the newly installed chain as well as the stretched chain lie against a long run of the tensioning track.

According to another embodiment of the present invention, a spring element can be positioned or applied between the supporting body element and the tensioning track, with the supporting body element and the tensioning track being joined together via bar- or rib-like interconnecting sections such that the tensioning track can be deflected with respect to the supporting body element. In this case, the interconnecting sections are designed such that they exhibit only low elastic stiffness. In any case, they are designed and arranged such that the tensioning track can be deflected with respect to the supporting body element, which is realized via the spring element, to force the tensioning track away from the supporting body element. The spring element can be a coil spring positioned in an appropriately dimensioned recess between tensioning track and supporting body element. Alternatively, a leaf spring or leaf-spring packet can also be used as the spring element. For simple mounting of the spring element, retaining means for the same are provided on the supporting body element and/or in the area of the tensioning track. In the case of a coil spring this can be, for example, cylindrical projections on which the coil spring is pressed with its ends.

According to another embodiment of the present invention, the tensioning track and the supporting body element can be joined together by rigid bar- or rib-like interconnecting sections. In this embodiment, there are no elastic interconnecting sections and no spring element; the tensioning track can not be deflected as a whole. The supporting body element, interconnecting sections, and tensioning track(s) here, too, form a one-piece part whose tensioning action results from the fact that the presetting of the traction medium as well as the geometry and dimensioning of the tensioning device are adapted to each other such that the desired chain tension results upon installation of the tensioning device.

The tensioning device according to the present invention can be produced in addition as a metal construction as well as plastic, as previously described. This permits very simple low-cost production of each of the types of tensioning device described above. In these devices, the tensioning track can consist of a plastic exhibiting high abrasion resistance and the supporting body element, of a different plastic. Both plastics can be injected in a single operating step using a two-component injection process. In this way, it is possible to produce the tensioning track and supporting body element using different plastic materials which best meet the demands made on the tensioning track and the supporting body element. The supporting body element can further be reinforced with glass fibers in order to attain high basic strength. Polyamides, especially polyamide 66 or 46, have proven to be suitable plastics. In addition, they possess very good antifriction properties so that the traction medium can slide nicely over the track.

For simple attachment to a third object, for example, a motor block or the like, at least one mounting hole for receiving an attaching element, e.g., an attaching screw can be provided. Where preferred, two mounting holes can be provided. In the mounting hole itself, there can be positioned a metal sleeve via which the pressure forces of the attaching element, for example, the pressure forces of an attaching screw are accommodated. The metal sleeve can be pressed into the mounting hole or die-sunk therein, for which purpose ultrasonic die-sinking is useful. Alternatively, it is possible in the case of a plastic version of the tensioning device to spray the metal sleeve with the plastic used in forming the mounting hole.

As already described, two opposing tension tracks can be provided on the supporting body element, being joined as one piece thereto. Depending on the version involved, each tensioning track can be joined with the supporting body element via elastic or rigid interconnecting sections. This tensioning device thus possesses a taut run and a slack run each engaging different sections of the traction medium. Since higher forces naturally prevail along the taut run, it has proven advantageous to have a design in which the tensioning track and possibly the bar- or rib-like interconnecting sections joining the track to the supporting body element are stiffer here than along the opposing slack side. In addition, a spring element can also be located between the supporting body element and each of the tensioning tracks. In this case, one spring element can be stronger than the other, the stronger spring element being located in the more stiffly dimensioned taut run.

BRIEF DESCRIPTION OF THE DRAWINGS

The present invention is described in more detail below on the basis of several preferred embodiments represented in the figures. In the drawings:

FIG. 1 shows a schematically illustrated traction medium drive with a tensioning device according to a first embodiment of the present invention.

FIG. 2 is a cross-section of the tensioning device taken along line A—A in FIG. 1.

FIG. 3 is a perspective view of a tensioning device according to a second embodiment of the present invention.

DETAILED DESCRIPTION OF THE PREFERRED EMBODIMENTS

Figure 5:
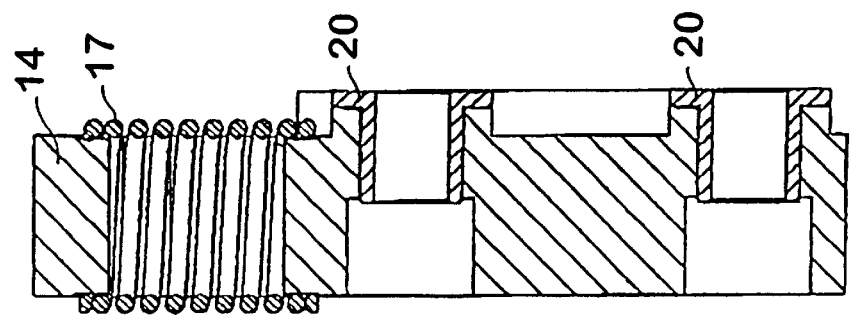
FIG. 5 is a cross-sectional view through the tensioning device of FIG. 4.

FIG. 1 shows in simplified representation a portion of a traction medium drive, for example, in an internal combustion engine, with traction medium 1, for example, in the form of a chain or a belt. In order to tension the traction medium 1, a tensioning device 2 is provided, consisting of a supporting body element 3, on which are provided two mounting holes 4 for attachment of the supporting body element 3 and thus the tensioning device 2 to an unshown third object, for example, a cylinder head. Each mounting hole 4 includes a metal sleeve 5 (see FIG. 2), which is pressed or countersunk into mounting hole 4 or attached with sprayed plastic. Two tensioning tracks 6 are joined via bar- or rib-like interconnecting sections 7 to form one piece with the supporting body element 3. An opening is located between the interconnecting sections, resulting in material savings and reduced weight. The tensioning device 2 can be made of plastic, i.e., the supporting body element, the interconnecting sections, and the tensioning tracks are formed as a one-piece molded plastic part. Preferably a polyamide material is used, which possesses sufficient strength and antifriction properties. Alternatively, it is also possible to form the tensioning device 2 from metal, for example, aluminum. In this case, the supporting body element, the interconnecting sections, and the tensioning tracks form a one-piece metal part. The use of metal sleeves can be omitted in this case.

The interconnecting sections 7 of the tensioning device 2 shown in FIG. 1 are elastically deformable, i.e., each tensioning track 6 is elastically movable with respect to the supporting body element. For this purpose, the interconnecting sections 7 exhibit an angled section 8, which is appropriately deformable. Additionally, preferably a spring element in the form of a coil spring 9 is provided, which is positioned between the supporting body element 3 and the corresponding tensioning track 6 and forces the tensioning track 6 away from the supporting body element. It should be pointed out that in the case of such an embodiment in which two opposing tensioning tracks are used, it is possible to design the tensioning track 6 as well as the interconnecting sections 7 of the taut run 10 as indicated by the rotational direction of the traction medium drive (arrow A) to be appropriately stiffer than the corresponding parts of the slack run 11 since higher forces prevail along the taut run 10. The coil spring 9 provided in the taut run 10 can also be more powerfully dimensioned than the coil spring 9 in the slack run 11.

Figure 8:
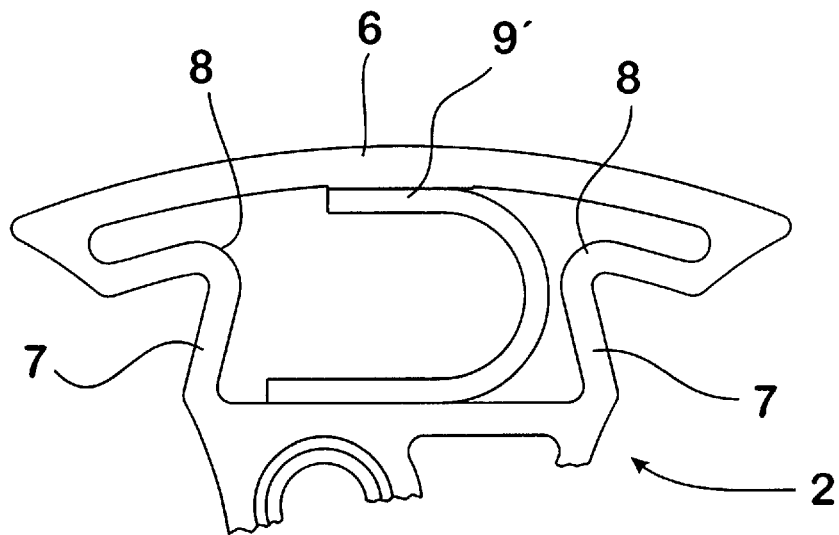
FIG. 8 is a partial view of the tensioning device shown in FIG. 1 having an alternate type of spring element.
Figure 9:
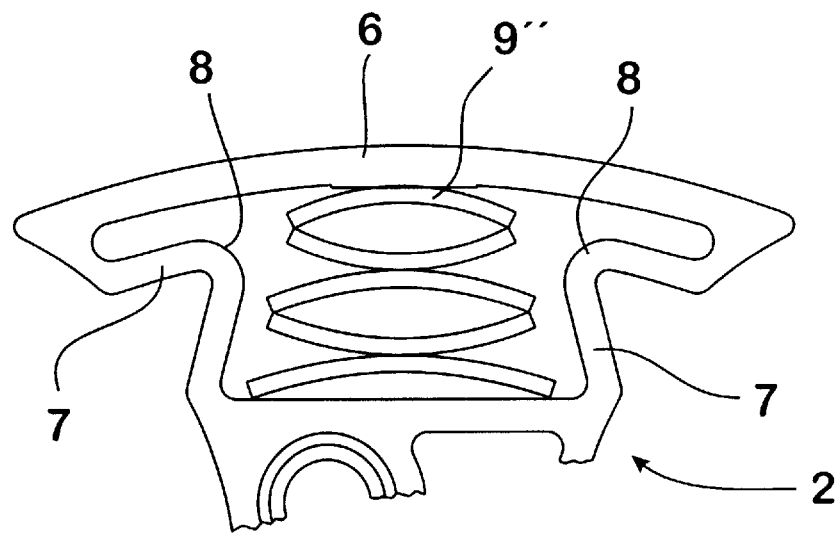
FIG. 9 is a partial view of the tensioning device shown in FIG. 1 having a second alternate type of spring element.

As shown in FIGS. 8 and 9, a leaf spring 9' or leaf spring packet 9" could also be used as the spring element positioned between the supporting body element 3 and the corresponding tensioning track 6.

The mode of operation of the tensioning device according to the present invention is as follows: due to the elastic force produced by the elastically deformable interconnecting sections 7 and the coil spring 9, the tensioning tracks 6 over which the traction medium 1 slides are pressed against the latter, through which the latter is tensioned. Due to the elastic properties, it is possible to compensate for any drive tolerances as well as changes within the drive resulting from thermal expansion or wear. The advantage of the doubly acting design according to FIG. 1 consists in the fact that the travel of a given tensioning track necessary for compensating for a lengthening of the traction medium can be halved as a result of allocation over both tensioning tracks.

Figure 4:
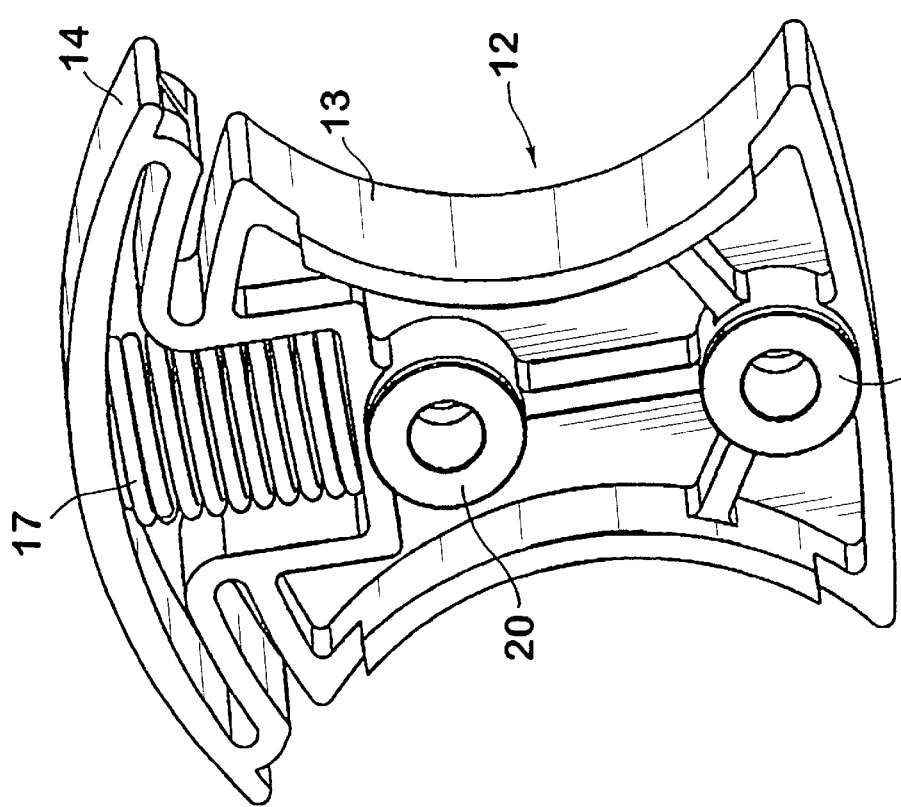
FIG. 4 is a perspective view of a tensioning device according to FIG. 3 with a mounted spring element.

FIG. 3 shows a second embodiment of a tensioning device 12 according to the present invention. This one also consists of a supporting body element 13 as well as a tensioning track 14, the two being joined via interconnecting sections 15 into a one-piece part, which can likewise be made from plastic or metal. Here, too, the interconnecting sections 15 are elastically designed and make possible relative movement of the tensioning track 14 with respect to the supporting body element 13. Depending on how stiff the interconnecting sections 15 are designed to be, it can be enough to provide only these interconnecting sections, which exercise sufficient elastic force. In addition, in this embodiment, which engages the traction medium at only one point, it is possible to position an elastic element in the form of a coil spring 17 in the recess 16 between the tensioning track 14 and the supporting body element 13, as is shown in FIG. 4. Appropriate retaining means 18 are provided in the form of cylindrical projections protruding into recess 16 and onto which the open ends of the coil spring 17 are pressed for holding coil spring 17. FIG. 3 shows the embodiment without the coil spring 17, and FIG. 4 shows the embodiment with coil spring 17. In addition, the metal sleeves 20 employed in the mounting holes 19 are shown in FIG. 4 and the corresponding sectional view in FIG. 5. These sleeves can also be pressed in or countersunk. Attachment via spraying with plastic is also conceivable.

Figure 6:
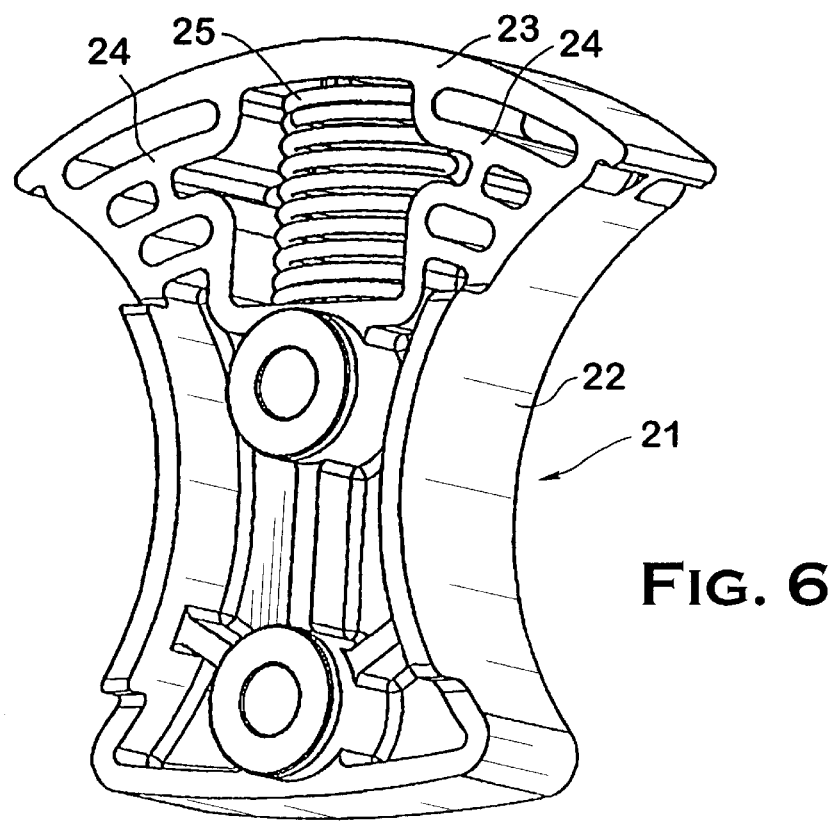
FIG. 6 is a perspective view of a tensioning device according to a third embodiment of the invention.

A third embodiment of a tensioning device 21 is shown in FIG. 6. This also includes a supporting body element 22 as well as a tensioning track 23 joined together as one piece via bar- or rib-like interconnecting sections 24. The interconnecting sections 24 are elastically designed or formed; however, here a honeycomb structure is employed in comparison to the essentially angled U-shaped design of the interconnecting sections of the previously described embodiments. The interconnecting bars run such that open chambers are formed, resulting in an open honeycomb-like structure. The design of the interconnecting sections 24 shown in FIG. 6 similarly makes possible elastic support of the tensioning track 23 on the supporting body element 22 that also includes a coil spring 25 for increasing the elastic force which can be applied to the traction medium. Here, too, as with the embodiments described previously, the spring element can be eliminated upon use of interconnecting bars of appropriate stiffness.

It remains to be mentioned that the embodiments of interconnecting sections 15 and 24 shown in FIGS. 4 and 6 can be used in the same way as in the tensioning device shown in FIG. 1, where two tensioning tracks are arranged on the supporting body element. It should further be kept in mind that a leaf spring or leaf-spring packet, secured via appropriately designed retaining means on the supporting body element and the tensioning tracks, can be used in place of the coil springs in any of the embodiments.

Figure 7:
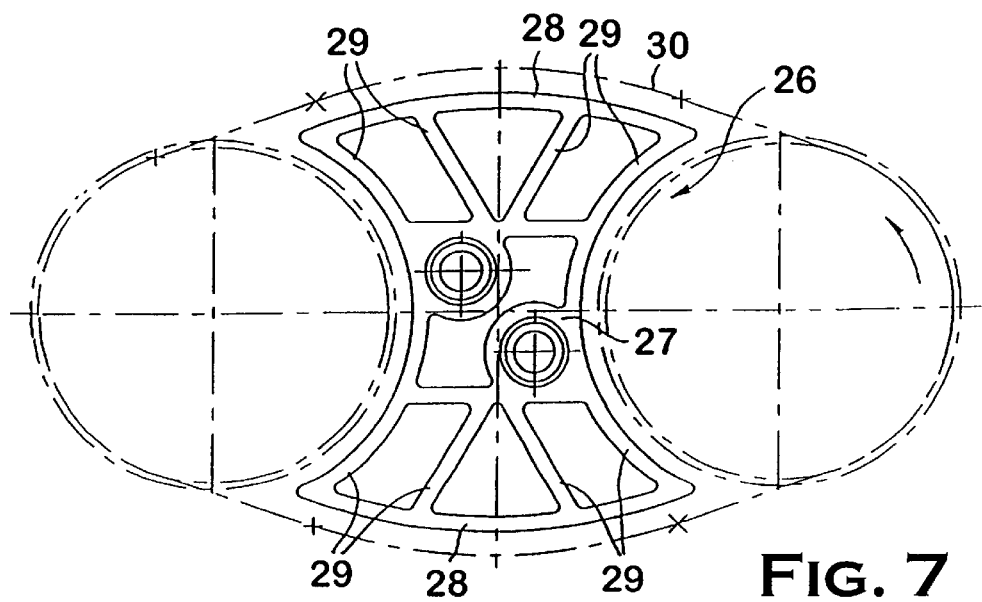
FIG. 7 is a schematic representation of a traction medium drive with a tensioning device according to a fourth embodiment of the present invention.

Finally, FIG. 7 shows a fourth embodiment of a tensioning device 26. This, too, consists of a supporting body element 27 on which two tensioning tracks 28 are joined as one piece via bar- or rib-like interconnecting sections 29, which are separated. from each other by openings. Versions in plastic and metal are also possible here. The interconnecting sections 29 of the tensioning device 26 (which represents the simplest design among the described embodiments) are rigid, i.e., the tensioning track 28 can not be deflected with respect to the supporting body element 27. The tensioning function of the tensioning device 26 is brought about by the fact that the presetting of the traction medium, as well as the geometry and dimensioning of the tensioning device 26, i.e., essentially the spacing, shape, and length of the sliding surfaces of the tracks 28, are adapted to each other such that the desired chain tension results upon installation of the tensioning device 26.

As already mentioned, all of embodiments described above can be formed from plastic or metal. Having proven itself in the case of a plastic version is polyamide, especially polyamide 66 or 46, which is very tough. In addition, polyamide exhibits good antifriction properties. It is possible here to produce the tensioning tracks using a different plastic or polyamide than that used in the supporting body element and the interconnecting sections. Thus, a first plastic or a first polyamide exhibiting good antifriction properties can be selected for the tensioning tracks. In contrast, a plastic or polyamide possessing very high basic strength can be selected for the supporting body element. Both plastics can be processed in one and the same injection process in forming the one-piece part. In addition, it is possible as an alternative to increase the basic strength of the supporting element by introducing glass fibers. These fibers should be provided only in the supporting body element, however, and not in the tensioning tracks in order to avoid having fibers removed by chain abrasion and becoming deposited in the chain. Alternatively, a metal version of the above-described examples is possible. In this case, too, elastic properties can be produced via appropriate design and dimensioning of the interconnecting sections.

LIST OF REFERENCE NUMBERS 1 traction medium
2 tensioning device 3 supporting body element
4 mounting holes
5 metal sleeve
6 tensioning tracks
7 interconnecting sections
8 angled section
9 coil spring
10 taut run
11 slack run
12 tensioning device
13 supporting body element
14 tensioning track
15 interconnecting sections
16 recess
17 coil spring
18 retaining means
19 mounting holes
20 metal sleeves
21 tensioning device
22 supporting body element
23 tensioning track
24 interconnecting sections
25 coil spring
26 tensioning device
27 supporting body element
28 tensioning tracks
29 interconnecting sections

What is claimed is:

1. Device for tensioning a traction medium, the device comprising a supporting body element (3, 13, 22, 27) attachable to a third object and at least one tensioning track (6, 14, 23, 28) capable of being applied against the traction medium (1), the supporting body element (3, 13, 22, 27) and the tensioning track (6, 14, 23, 28) being connected via elastically deformable bar or rib interconnecting sections (7, 15, 24, 29) located between the supporting body element and the tensioning track, and the supporting body element, the tensioning track, and the elastically deformable bar or rib interconnecting sections being integrally formed from a one-piece material member.

2. Tensioning device according to claim 1, wherein the interconnecting sections (7, 15) are angled.

3. Tensioning device according to claim 1, wherein the interconnecting sections (24) are designed with an open cell arrangement.

4. Tensioning device according to claim 1, wherein the tensioning device is formed of metal.

5. Tensioning device according to claim 1, wherein a spring element is positioned between the supporting body element (3, 13, 22) and the tensioning track (6, 14, 23), which are joined together via the elastically deformable bar or rib interconnecting sections (7, 15, 24).

6. Tensioning device according to claim 5, wherein the spring element is a coil spring (9, 17, 25).

7. Tensioning device according to claim 5, wherein the spring element is a leaf spring or leaf-spring packet.

8. Tensioning device according to claim 5, wherein retaining elements (18) for the spring element are provided on the supporting body element and/or in the area of the tensioning track.

9. Tensioning device according to claim 1, wherein a spring element is positioned between the supporting body element and the tensioning track, which are joined together via the bar or rib interconnecting sections such that the tensioning track can be deflected with respect to the supporting body element.

10. Tensioning device according to claim 9, wherein the spring element is a coil spring (9, 17, 25).

11. Tensioning device according to claim 9, wherein the spring element is a leaf spring or leaf-spring packet.

12. Tensioning device according to claim 9, wherein retaining elements (18) for the spring element are provided on the supporting body element and/or in the area of the tensioning track.

13. Tensioning device according to claim 1, wherein the tensioning device is formed from plastic.

14. Tensioning device according to claim 13, wherein the supporting body element (3, 13, 22, 27) is reinforced with glass fibers.

15. Tensioning device according to claim 13, the tensioning track (6, 14, 23, 28) is formed of a plastic exhibiting high abrasion resistance while the supporting body element (3, 13, 22, 27) is formed of a different plastic.

16. Tensioning device according to claim 15, wherein the supporting body element (3, 13, 22, 27) is reinforced with glass fibers.

17. Tensioning device according to claim 13, wherein the plastic is a polyamide.

18. Tensioning device according to claim 17, wherein the polyamide is polyamide 66 or 46.

19. Tensioning device according to claim 1, wherein at least one mounting hole (4, 19) for receiving an element for attaching the supporting body element (3, 13, 22, 27) to the third object is provided on the supporting body element (3, 13, 22, 27).

20. Tensioning device according to claim 19, wherein two mounting holes (4, 19) are provided.

21. Tensioning device according to claim 19, wherein a metal sleeve (5, 20) is located in the mounting hole (4, 19).

22. Tensioning device according to claim 21, wherein the metal sleeve (5, 20) is pressed or die-sunk in the mounting hole.

23. Tensioning device according to claim 21, wherein the metal sleeve (5, 20) in the plastic mounting hole (4, 19) is sprayed with plastic.

24. Tensioning device according to claim 1, wherein two opposing tensioning tracks (6, 28) are provided on and are joined together with the supporting body element (3, 27) as one piece.

25. Tensioning device according to claim 24, wherein a spring element is positioned between the supporting body element (3) and each tensioning track (6), one spring element being stronger than the other.

26. Tensioning device according to claim 24, wherein each of the tensioning tracks (6, 28) is joined via bar or rib interconnecting sections (7, 29) with the supporting body element (3, 27), a first one of the tensioning tracks (6, 28) adapted to act on a taut run of the traction medium and the interconnecting sections (7, 29) joining the first one of the tensioning tracks with the supporting body element (3, 27) being of a stiffer design than the opposing tensioning track.

27. Tensioning device according to claim 26, wherein a spring element is positioned between the supporting body element (3) and each tensioning track (6), one spring element being stronger than the other.

* * * * *